US010484948B2

(12) United States Patent
Xia (10) Patent No.: US 10,484,948 B2
(45) Date of Patent: Nov. 19, 2019

(54) MOBILE TERMINAL STANDBY METHOD, DEVICE THEREOF, AND MEDIUM (71) Applicant: Xiaomi Inc., Beijing (CN)

(72) Inventor: Xinqiu Xia, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 16/003,948

(22) Filed: Jun. 8, 2018

(65) Prior Publication Data

US 2018/0295582 A1 Oct. 11, 2018

Related U.S. Application Data (63) Continuation of application No. 14/587,188, filed on Dec. 31, 2014, now abandoned, which is a (Continued)

(30) Foreign Application Priority Data

Nov. 12, 2012 (CN) .......................... 2012 1 0451298

(51) Int. Cl.
H04W 64/00 (2009.01)
H04W 52/02 (2009.01)
(Continued)

(52) U.S. Cl.
CPC .... *H04W 52/0254* (2013.01); *G06K 9/00832* (2013.01); *G06K 9/6202* (2013.01);
(Continued)

(58) Field of Classification Search
CPC ............. H04W 52/0254; H04W 16/18; H04W 64/006; H04W 84/02; G06K 9/00832;
G06K 9/6202; H04M 1/72569; H04M 1/72572; H04M 1/72577; H04N 5/247; H04L 67/36; H04L 61/1541
(Continued)

(56) References Cited

U.S. PATENT DOCUMENTS

2003/0096594 A1 5/2003 Naboulsi
2006/0177098 A1* 8/2006 Stam ...................... B60Q 1/085
382/104
(Continued)

FOREIGN PATENT DOCUMENTS

CN 201204700 Y 3/2009
CN 101448340 A 6/2009
(Continued)

OTHER PUBLICATIONS

International Search Report of PCT/CN2013/086535, from the State Intellectual Property Office of China, dated Jan. 23, 2014.
(Continued)

Primary Examiner — Phuoc H Doan
(74) Attorney, Agent, or Firm — Finnegan, Henderson, Farabow, Garrett & Dunner LLP (57) ABSTRACT A method for enabling a mobile terminal to be on standby includes determining that a movement speed of the mobile terminal is greater than a preset speed, judging whether the mobile terminal is within a driver's area in an automobile, and enabling the mobile terminal to enter into a standby state if the mobile terminal is within the driver's area.

9 Claims, 9 Drawing Sheets

Related U.S. Application Data continuation of application No. PCT/CN2013/086535, filed on Nov. 5, 2013.

(51) Int. Cl.
| | |
|---|---|
| *H04M 1/725* | (2006.01) |
| *G06K 9/00* | (2006.01) |
| *G06K 9/62* | (2006.01) |
| *H04W 4/02* | (2018.01) |

(52) U.S. Cl.
CPC ....... *H04M 1/72577* (2013.01); *H04W 4/027* (2013.01); *H04M 1/72569* (2013.01); *H04M 1/72572* (2013.01); *H04M 2250/52* (2013.01); *Y02D 70/00* (2018.01); *Y02D 70/142* (2018.01); *Y02D 70/144* (2018.01); *Y02D 70/164* (2018.01); *Y02D 70/166* (2018.01)

(58) Field of Classification Search
USPC ........................................ 455/456.1; 345/427
See application file for complete search history.

(56) References Cited

U.S. PATENT DOCUMENTS

| | | | |
|---|---|---|---|
| 2006/0265112 A1* | 11/2006 | Hoeffel | B60T 8/172 701/32.4 |
| 2007/0026850 A1 | 2/2007 | Keohane et al. | |
| 2008/0240492 A1 | 10/2008 | Ohira et al. | |
| 2009/0102788 A1* | 4/2009 | Nishida | G06F 3/017 345/158 |
| 2010/0291926 A1* | 11/2010 | Ito | H04W 48/18 455/434 |
| 2010/0297930 A1 | 11/2010 | Harris | |
| 2011/0009107 A1* | 1/2011 | Guba | H04W 4/027 455/418 |
| 2011/0117903 A1* | 5/2011 | Bradley | H04W 4/026 455/418 |
| 2012/0001843 A1 | 1/2012 | Gravino | |
| 2012/0018240 A1* | 1/2012 | Grubaugh | B60T 7/14 180/273 |
| 2012/0214463 A1* | 8/2012 | Smith | H04M 1/72577 455/418 |
| 2013/0202213 A1 | 8/2013 | Adamek et al. | |
| 2017/0140242 A1 | 5/2017 | Saklatvala | |

FOREIGN PATENT DOCUMENTS

| | | |
|---|---|---|
| CN | 101673182 A | 3/2010 |
| CN | 101997978 A | 3/2011 |
| CN | 102957800 A | 3/2013 |
| JP | 2001136579 A | 5/2001 |
| JP | 2001251670 A | 9/2001 |
| JP | 2003284120 A | 10/2003 |
| JP | 2004242174 A | 8/2004 |
| JP | 2006056393 A | 3/2006 |
| JP | 2006180323 A | 7/2006 |
| JP | 2009140445 A | 6/2009 |
| JP | 4308381 B2 | 8/2009 |
| JP | 2010278595 A | 12/2010 |
| JP | 2011172195 A | 9/2011 |
| JP | 2012169719 A | 9/2012 |
| KR | 20110050275 A | 5/2011 |
| KR | 20120020164 A | 3/2012 |
| RU | 2271286 C2 | 3/2006 |
| RU | 2008143061 A | 5/2010 |
| WO | WO 02/25970 A1 | 3/2002 |
| WO | WO 2008/027076 A1 | 3/2008 |
| WO | WO 2010/042545 A2 | 4/2010 |

OTHER PUBLICATIONS

English version of International Search Report for International Application No. PCT/CN2013/086535, from the State Intellectual Property Office of the P.R. China, dated Jan. 23, 2014.

* cited by examiner

Taking a photo by a front camera and/or a back camera, and comparing the photo with a pre-stored picture of a corresponding position — S1021

If a similarity between the photo and the pre-stored picture of the corresponding position is greater than a preset threshold, determining that the location of the mobile terminal is within the driver's area — S1022

Performing data analysis on the camera photo, and searching for a shape-similar object that has a shape similarity to a key reference object in the pre-stored picture of the corresponding position greater than a first threshold — S401

Determining a location similarity of the similar-shape object to the key reference object — S402

Determining similarity between the camera photo and the pre-stored picture of the corresponding position according to the shape similarity and the location similarity — S403

MOBILE TERMINAL STANDBY METHOD, DEVICE THEREOF, AND MEDIUM

CROSS-REFERENCE TO RELATED APPLICATIONS

This application is a continuation of U.S. application Ser. No. 14/587,188, filed on Dec. 31, 2014, which is a continuation of International Application No. PCT/CN2013/086535, filed Nov. 5, 2013, which is based upon and claims the benefit of priority to Chinese Patent Application No. 201210451298.9, filed on Nov. 12, 2012, the entire contents of all of which are incorporated herein by reference.

TECHNICAL FIELD

The present disclosure generally relates to mobile terminals and, more particularly, to a method for enabling a mobile terminal to be on standby and an apparatus thereof.

BACKGROUND

Automobile drivers using mobile terminals while driving often causes safety issues. According to an analysis report from the National Highway Traffic Safety Administration of the United States, more than 5,000 people nationwide die every year in traffic accidents resulting from lack of concentration caused by, e.g., texting or making phone calls while driving.

Currently, about 50 countries and areas across the world have explicitly banned the use of mobile terminals while driving. Some countries impose very severe punishments on this. For example, in Singapore, a first-time offender will receive a fine of up to S$1,000 and imprisonment of six months, and a repeater will receive a fine of up to S$2,000 and imprisonment of one year. In the UK, a driver who uses a mobile terminal while driving may face a charge of "reckless driving" and may be imprisoned for up to two years. Many cities in China have also started to impose heavy punishments on drivers who use mobile terminals while driving.

Conventionally, restricting drivers from using mobile terminals while driving is enforced by traffic police officers who monitor the drivers on the road. Drivers who use mobile terminals while driving are then punished.

Another approach is to use traffic cameras to take photos and obtain information. Drivers who are caught using mobile terminals by the traffic cameras are then punished.

However, neither of the above-discussed approaches can catch all drivers who violate the rule, and thus using mobile terminals while driving cannot be completed eliminated.

SUMMARY

In accordance with the disclosure, there is provided a method for enabling a mobile terminal to be on standby. The method includes determining that a movement speed of the mobile terminal is greater than a preset speed, judging whether the mobile terminal is within a driver's area in an automobile, and enabling the mobile terminal to enter into a standby state if the mobile terminal is within the driver's area.

Also in accordance with the disclosure, there is provided a device for enabling a mobile terminal to be on standby. The device includes a processor and a non-transitory computer-readable storage medium storing instructions. The instructions, when executed by the processor, cause the processor to determine that a movement speed of the mobile terminal is greater than a preset speed, judge whether the mobile terminal is within a driver's area in an automobile, and enable the mobile terminal to enter into a standby state if the mobile terminal is within the driver's area.

Also in accordance with the disclosure, there is provided a non-transitory computer-readable storage medium storing instructions. The instructions, when executed by one or more processors in a terminal, cause the one or more processors to determine that a movement speed of the mobile terminal is greater than a preset speed, judge whether the mobile terminal is within a driver's area of an automobile, and enable the mobile terminal to enter into a standby state if the location of the mobile terminal is within the driver's area.

It should be understood that, the general description above and the detailed description below are merely exemplary and explanatory, and do not limit the disclosure.

The accompanying drawings, which are incorporated in and constitute a part of this specification, illustrate several embodiments of the invention and together with the description, serve to explain the principles of the invention.

DETAILED DESCRIPTION

Embodiments consistent with the present disclosure include a method and apparatus for enabling a mobile terminal to be on standby.

Consistent with the present disclosure, if a movement speed of a mobile terminal is detected to be greater than a preset speed, it is then determined that the mobile terminal is in a fast movement. Then it is judged whether a location of the mobile terminal is within a driver's area. If so, it indicates that the user is using the mobile terminal while driving. In this situation, the mobile terminal is put into a standby state, so as to restrict the use of the mobile terminal by the driver while driving.

Figure 1:
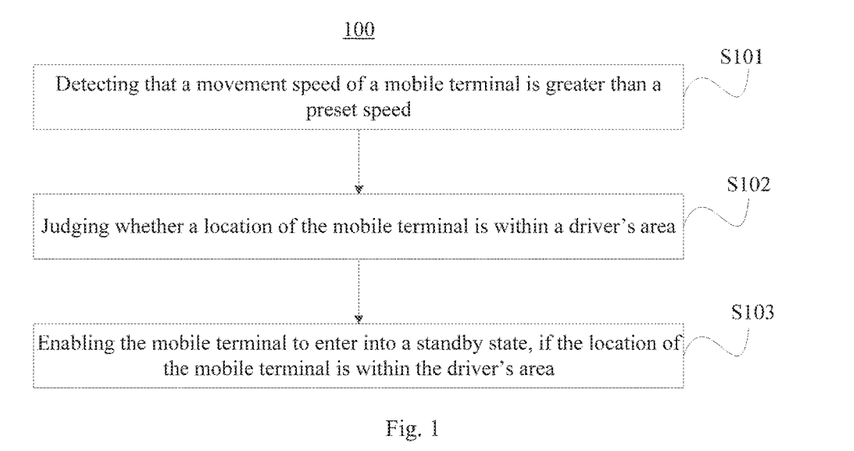
FIG. 1 is a flow chart showing an exemplary method for enabling a mobile terminal to be on standby, according to the present disclosure.

FIG. 1 shows an exemplary method 100 for enabling a mobile terminal to be on standby consistent with embodiments of the present disclosure. As shown in FIG. 1, at S101, it is detected that a movement speed of the mobile terminal is greater than a preset speed. At S102, it is judged whether a location of the mobile terminal is within a driver's area. At S103, if the location of the mobile terminal is within the driver's area, then the mobile terminal is enabled to enter into a standby state.

According to the present disclosure, if the mobile terminal is moving at a relatively high speed and thus its movement speed is greater than the preset speed, and if the mobile terminal is within the driver's area, then the user is likely using the mobile terminal while driving. In this situation, the mobile terminal is put into the standby state to restrict the driver's use of the mobile terminal while driving.

In some embodiments, in order to distinguish a driving state of a user from moving states with relatively low speeds such as a walking state, the preset speed may be set to 5 kilometer/hour. However, the preset speed may be set to another reasonable value, as long as it may distinguish a driving state and moving states with relatively low speeds such as a walking state of the user.

In some embodiments, before S101, it may be determined that the mobile terminal is in an operation state. That is, the location of the mobile terminal is determined only when the mobile terminal is in both the operation state and the moving state, so that a processing load of the mobile terminal can be reduced. The operation state may be defined as a state that requires participation of the user such as, for example, a state in which an operation by the user is received, a phone call request is detected, or a short message notification is generated. The operation state may also include other states that remind the user to perform certain operation on the mobile terminal, such as a notification automatically prompted by software installed on the mobile terminal.

Figure 2:
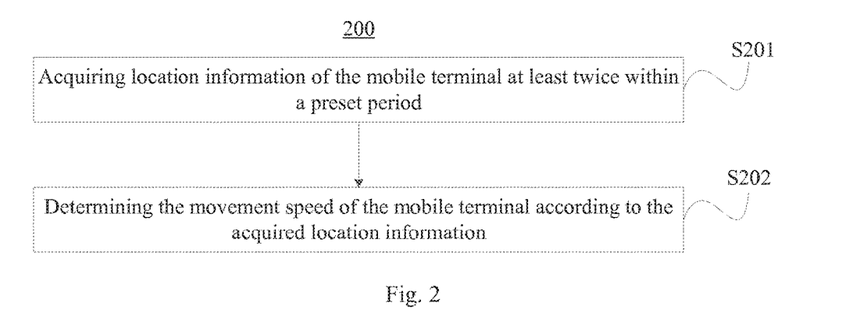
FIG. 2 is a flow chart showing an exemplary method for acquiring a movement speed, according to the present disclosure.

In some embodiments, before S101, the mobile terminal may acquire the movement speed of the mobile terminal in real time, so as to more accurately determine the movement speed of the mobile terminal. FIG. 2 shows an exemplary method 200 for acquiring the movement speed of the mobile terminal consistent with embodiments of the present disclosure. As shown in FIG. 2, at S201, at least two items of location information of the mobile terminal are acquired, each piece of location information is acquired at a certain timing within a preset period. At S202, the movement speed of the mobile terminal is determined according to the acquired location information.

Consistent with the present disclosure, if two items of location information among the at least two items of location information are different from each other, then it indicates that the location of the mobile terminal changes when the two items of location information are acquired, and thus it may be determined that the mobile terminal is in a moving state. The movement speed of the mobile terminal may be determined according to a distance between locations at which the two items of location information are acquired and a time difference between the timings at which the two items of location information are acquired. In some embodiments, the location information of the mobile terminal may be acquired using a Global Positioning System (GPS). The preset period may be 50 ms to 1 s.

In some embodiments, a movement speed of the automobile can be acquired through an on-board computer mounted on the automobile, and be used as the movement speed of the mobile terminal. The movement speed of the mobile terminal can also be acquired using other feasible methods, a description of which is omitted here.

Figure 3:
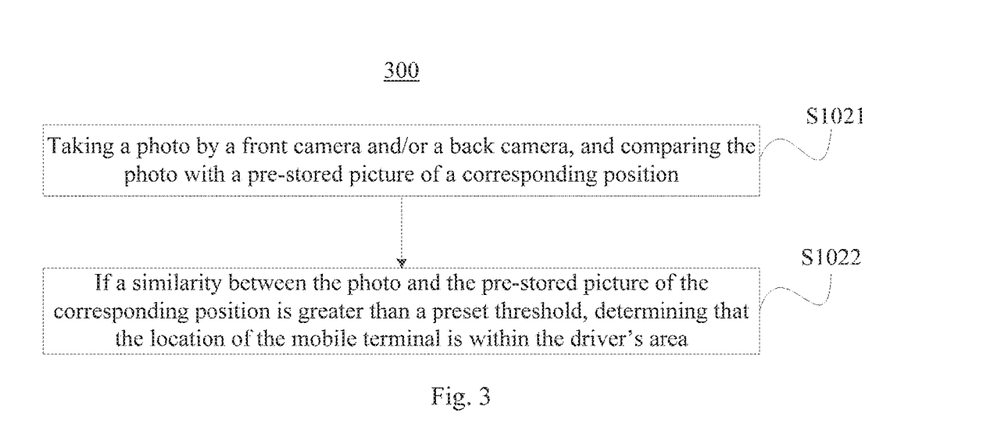
FIG. 3 is a flow chart showing an exemplary method for judging a location of the mobile terminal, according to the present disclosure.

Consistent with the present disclosure, many approaches can be adopted to judge whether the location of the mobile terminal is within the driver's area at S102 in FIG. 1. FIG. 3 shows an exemplary method 300 for judging whether the location of the mobile terminal is located within the driver's area consistent with embodiments of the present disclosure. As shown in FIG. 3, at S1021, a photo is taken by a front camera and/or a rear camera of the mobile terminal (such a photo is also referred to as a "camera photo"), which is compared with a pre-stored picture of a corresponding position. At S1022, if a similarity between the camera photo and the pre-stored picture of the corresponding position is greater than a preset threshold (such a similarity is also referred to as a "picture similarity"), it is determined that the location of the mobile terminal is within the driver's area.

In general, an automobile may be a left-hand drive automobile or a right-hand drive automobile. When the user in a driver position holds the mobile terminal with his hand, it is easier to take photos of front and/or back of the driver position. Therefore, the pre-stored picture of a corresponding position may include a left-front view, a right-front view, a left-rear view, or a right-rear view. The left-front view includes a photo of a view when looking forward from a driver position in a left-hand drive automobile that is taken and stored in advance. The right-front view includes a photo of a view when looking forward from the driver position in a right-hand drive automobile that is taken and stored in advance. The left-rear view includes a photo of a view when looking backward from the driver position in a left-hand drive automobile that is taken and stored in advance. The right-rear view includes a photo of a view when looking backward from the driver position in a right-hand drive automobile that is taken and stored in advance.

In some embodiments, comparing the camera photo with the pre-stored picture of the corresponding position in S1021 of FIG. 3 includes determining a region in which the mobile terminal or the driver is located according to a type of a current network into which the mobile terminal is connected. If the mobile terminal or the driver is located in a left-hand drive region, then a camera photo taken by the front camera is compared with the left-front view and a camera photo taken by the rear camera is compared with the left-rear view. On the other hand, if the mobile terminal or the driver is located in a right-hand drive region, then a camera photo taken by the front camera is compared with the right-front view and a camera photo taken by the rear camera is compared with the right-rear view.

In some embodiments, determining the region in which the driver is located according to the type of the current network may include acquiring a Mobile Country Code (MCC) and a Mobile Network Code (MNC) of the current network, determining a current country or area according to the MCC and the MNC, and determining whether the current country or area is a left-hand drive region or a right-hand drive region. For example, Hong Kong is a right-hand drive region.

In some embodiments, a key reference object may be preset in the pre-stored pictures of the corresponding position, and an object (also referred to as a "similar-shape object") having a shape similar to the key reference object is searched for in the camera photo. The picture similarity may be determined according to a shape similarity and a location similarity between the key reference object and the similar-shape object.

Figure 4:
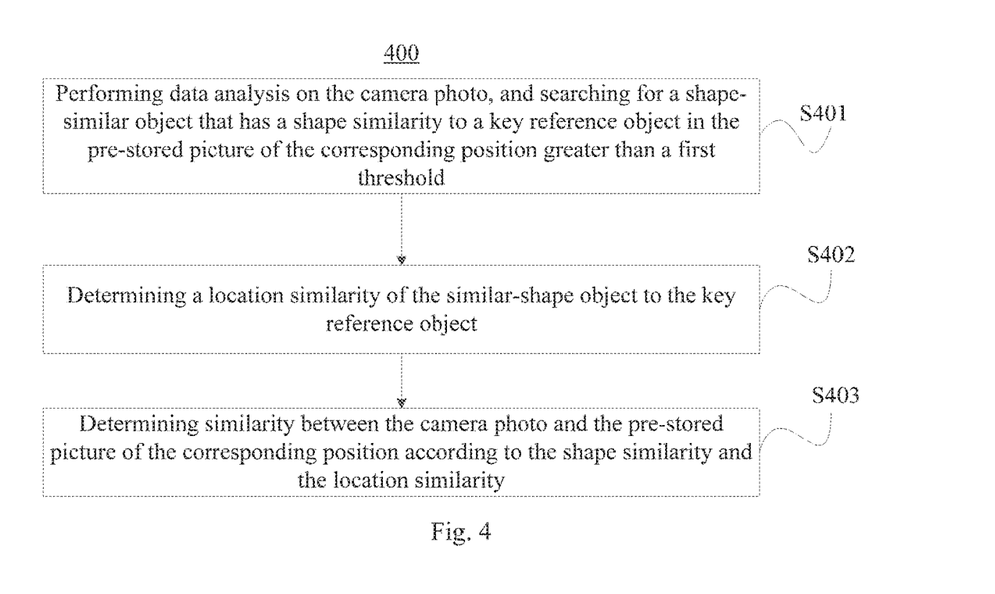
FIG. 4 is a flow chart showing an exemplary method for comparing pictures, according to the present disclosure.

FIG. 4 shows an exemplary method 400 for comparing the camera photo with the pre-stored picture of the corresponding position at S1021 consistent with embodiments of the present disclosure. As shown in FIG. 4, at S401, data analysis is performed on the camera photo to search for a similar-shape object that has a shape similarity to a key reference object in the pre-stored picture of the corresponding position that is greater than a first threshold. At S402, a location similarity of the similar-shape object to the key reference object is determined. At S403, the picture similarity is determined according to the shape similarity and the location similarity. S403 may be performed by methods such as data analysis and the like, a description of which is omitted here.

In some embodiments, the first threshold may be set to 60%-90%, and may be determined according to the selected key reference object. For example, if the key reference object has a small difference in shape among different automobiles, the first threshold may be set to 80%-90%. On the other hand, if the key reference object is possible to have a relatively large difference in shape among different automobiles, the first threshold may be set to 60%-70%.

Determining the picture similarity according to both the shape similarity and the location similarity avoids the drawbacks associated with a determination according to only one of the shape similarity and the location similarity. For example, if only the shape similarity is used, a user in the passenger seat may be determined as a user driving the automobile, and thus the normal use by such a user may be impeded. On the other hand, if only the location similarity is used, a misjudgment may be made due to a possible slight deviation between the location at which the camera photo is taken and the location at which the pre-stored picture is taken, and thus the mobile terminal may not be timely put into the standby state when the user is driving the automobile.

Figure 5:
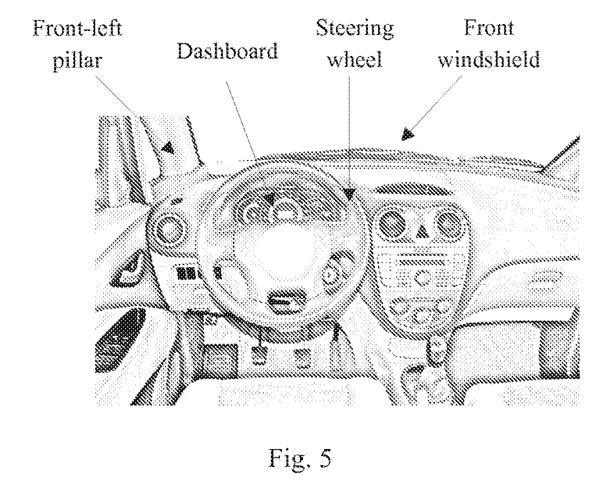
FIG. 5 is a left-front view according to an embodiment of the present disclosure.
Figure 6:
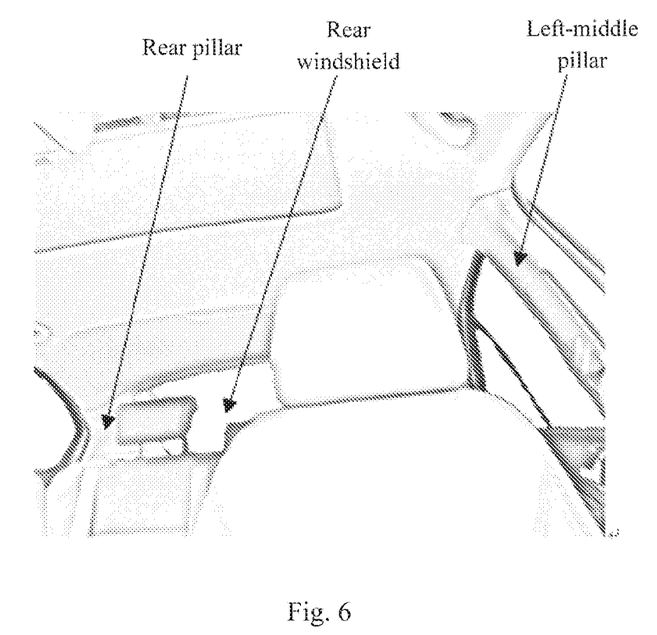
FIG. 6 is a left-rear view according to an embodiment of the present disclosure.

Particularly, if the pre-stored picture of the corresponding position is the left-front view, as shown in FIG. 5, the key reference object at S401 includes one of a steering wheel, a dashboard, a left-front pillar, or a front windshield, or a combination thereof. If the pre-stored picture of the corresponding position is the right-front view, which may be a mirror reflection picture of that shown in FIG. 5, the key reference object at S401 includes one of a steering wheel, a dashboard, a right-front pillar, or a front windshield, or a combination thereof. If the pre-stored picture of the corresponding position is the left-rear view, as shown in FIG. 6, the key reference object at S401 includes one of a left-middle pillar, a rear windshield, or a rear pillar, or a combination thereof. If the pre-stored picture of the corresponding position is the right-back view, which may be a mirror reflection picture of that shown in FIG. 6, the key reference object at S401 includes one of a right-middle pillar, a rear windshield, or a rear pillar, or a combination thereof. Consistent with the present disclosure, the key reference object may include another object, a description of which is omitted here.

In some embodiments, the preset threshold at S1022 may be set depending on the selection of the key reference object.

For example, if the key reference object of the left-front view is the steering wheel or the left-front pillar, since there are many types of steering wheels and a relatively large difference exists among them, the preset threshold is set to 60%-70% in order to avoid determining a user who is driving as a user who is not driving due to the difference in shape. As another example, if the key reference object of the left-rear view is the rear windshield or the rear pillar, since the shapes of the rear windshield and the rear pillar are relatively regular, and usually there is only a difference in location between the camera photos of the rear windshield or the rear pillar taken at the driver position and at the passenger position, the preset threshold may be set to 80%-90% in order to avoid a misjudgment on whether the user is driving the automobile.

Consistent with embodiments of the present disclosure, whether the location of the mobile terminal is within the driver's area may also be judged through a sensor of the automobile. In some embodiments, at least one sensor may be mounted at different locations inside the automobile. For example, an infrared sensor can be mounted beside the driver's seat. If the mobile terminal receives a signal from the infrared sensor, it indicates that the mobile terminal is located within the driver's area. In order to avoid blind spots within the driver's area, sensors may be mounted at, for example, three or four locations inside the automobile, to increase the accuracy of determining the location of the mobile terminal. Other sensors may also be used to determine the accurate location of the mobile terminal, and other feasible methods may also be adopted to judge whether the mobile terminal is within the driver's area, a description of which is omitted here.

Figure 7:
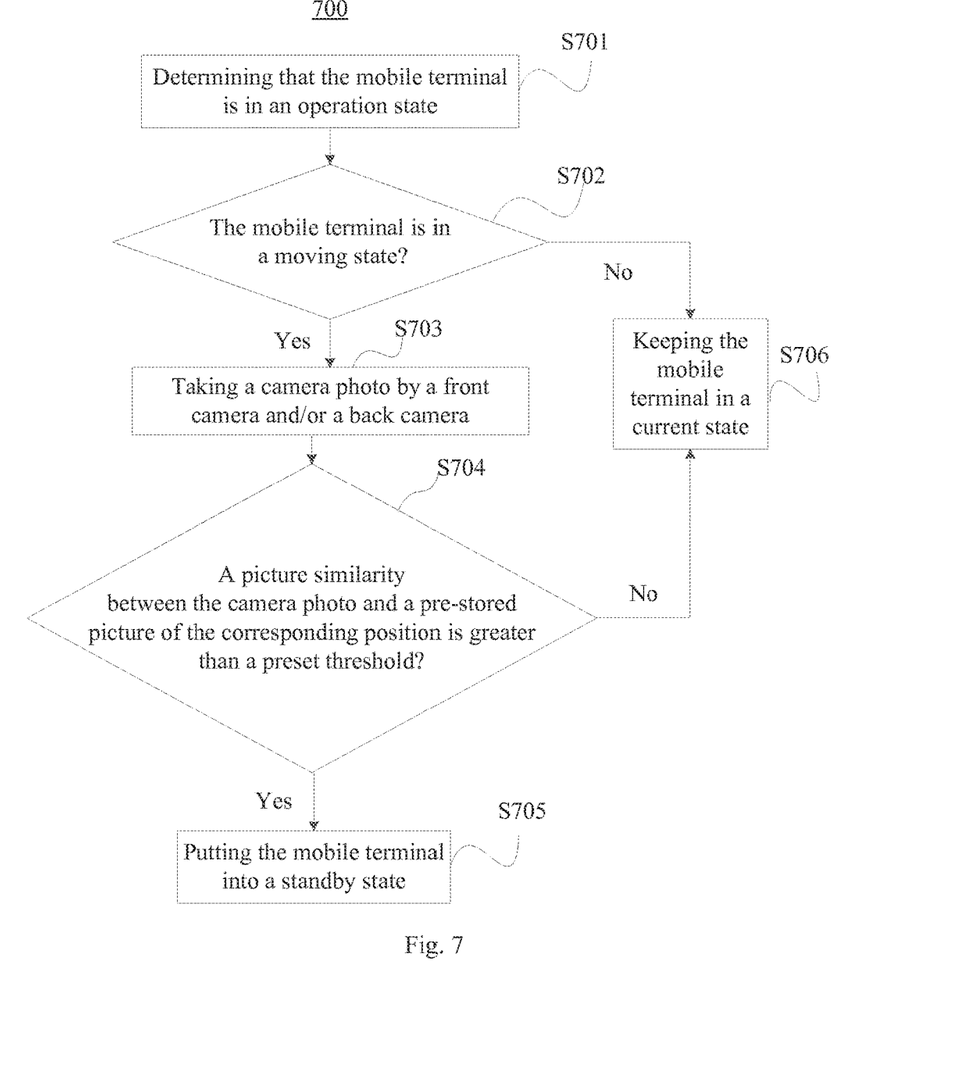
FIG. 7 is a flow chart showing another exemplary method for enabling a mobile terminal to be on standby, according to the present disclosure.

FIG. 7 shows another exemplary method 700 for enabling a mobile terminal to be on standby consistent with embodiments of the present disclosure. As shown in FIG. 7, at S701, it is determined that the mobile terminal is in an operation state. At S702, it is judged whether the mobile terminal is in a moving state using, for example, a GPS. If the mobile terminal is in a moving state (S702—Yes), S703 is performed. If the mobile terminal is not in a moving state (S702—No), S706 is performed. At S703, a camera photo is taken by a front camera and/or a back camera of the mobile terminal. At S704, the camera photo is compared with a pre-stored picture of a corresponding position, to judge whether a picture similarity between the camera photo and the pre-stored picture of the corresponding position is greater than a preset threshold. If the picture similarity is greater than the preset threshold (S704—Yes), S705 is performed. If the picture similarity is not greater than the preset threshold (S704—No), S706 is performed. At S705, the mobile terminal is put into a standby state. At S706, the mobile terminal is kept in a current state.

Figure 8:
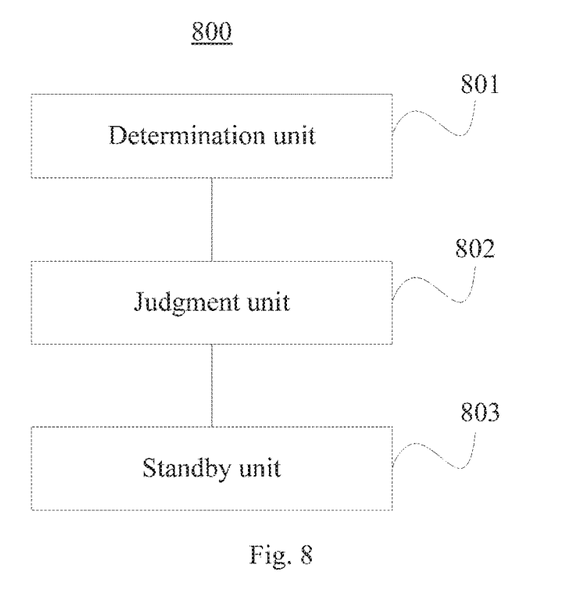
FIG. 8 is a block diagram illustrating an exemplary apparatus for enabling a mobile terminal to be on standby, according to the present disclosure.

FIG. 8 schematically shows an exemplary apparatus 800 for enabling a mobile terminal to be on standby consistent with embodiments of the present disclosure. The apparatus 800 includes a determination unit 801 configured to determine that a movement speed of the mobile terminal is greater than a preset speed, a judgment unit 802 configured to judge whether a location of the mobile terminal is within a driver's area, and a standby unit 803 configured to enable the mobile terminal to enter into a standby state if the location of the mobile terminal is within the driver's area.

Figure 9:
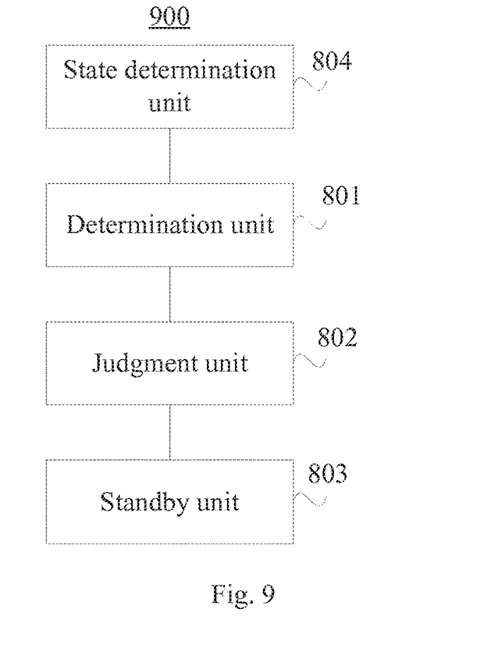
FIG. 9 is a block diagram illustrating another exemplary apparatus for enabling a mobile terminal to be on standby, according to the present disclosure.

FIG. 9 schematically shows another exemplary apparatus 900 for enabling a mobile terminal to be on standby consistent with embodiments of the present disclosure. The apparatus 900 is similar to the apparatus 800, except that the apparatus 900 further includes a state determination unit 804, configured to determine whether the mobile terminal is in an operation state.

By determining whether the mobile terminal is in an operation state by the state determination unit 804, the location of the mobile terminal is determined only when the mobile terminal is in both the operation state and the moving state, so that a processing load of the mobile terminal can be reduced. Details of how the state determination unit 804 determines whether the mobile terminal is in the operation state are similar to those described above in connection with, e.g., FIGS. 1 and 7, and thus are not repeated here.

Figure 10:
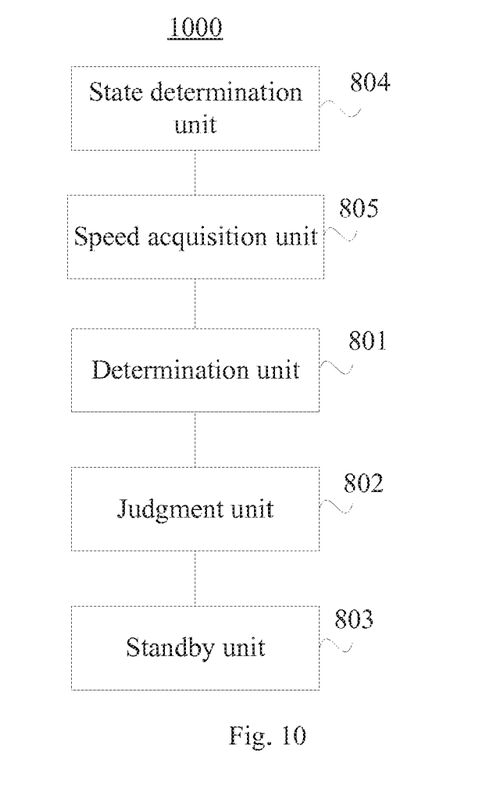
FIG. 10 is a block diagram illustrating a further exemplary apparatus for enabling a mobile terminal to be on standby, according to the present disclosure.

FIG. 10 schematically shows another exemplary apparatus 1000 for enabling a mobile terminal to be on standby consistent with embodiments of the present disclosure. The apparatus 1000 is similar to the apparatus 900, except that the apparatus 1000 further includes a speed acquisition unit 805 configured to acquire the movement speed of the mobile terminal, before the determination unit 801 determines that the movement speed of the mobile terminal is greater than a preset speed. The speed acquisition unit 805 may acquire the movement speed of the mobile terminal in real time, so as to improve the accuracy of determining the movement speed of the mobile terminal.

Figure 11:
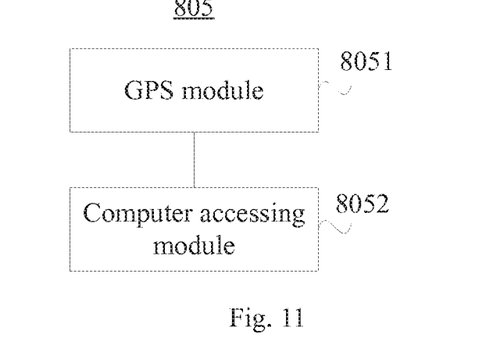
FIG. 11 is a block diagram illustrating an exemplary speed acquiring module according to the present disclosure.

FIG. 11 schematically shows an example of the speed acquisition unit 805 consistent with embodiments of the present disclosure, which includes a GPS module 8051 configured to acquire at least two items of location information of the mobile terminal at different timings within a preset period and determine the movement speed of the mobile terminal according to the location information. Details of acquiring the location information and determining the movement speed are similar to those described above in connection with, e.g., FIGS. 1 and 2, and thus are not repeated here.

Further, as shown in FIG. 11, the speed acquisition unit 805 further includes a computer accessing module 8052 configured to acquire a movement speed of the automobile from an on-board computer as the movement speed of the mobile terminal.

Other feasible approaches may also be adopted to acquire the movement speed of the mobile terminal, details of which are omitted here.

Figure 12:
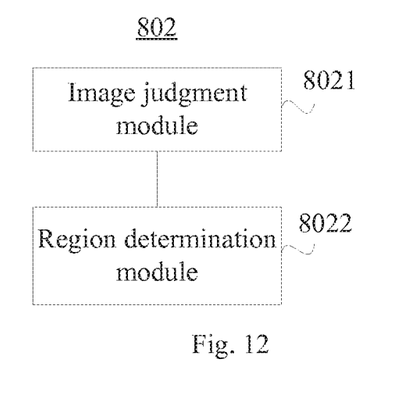
FIG. 12 is a block diagram illustrating an exemplary judgment unit according to the present disclosure.

The judgment unit 802 may be configured in various implementations, as long as it can judge whether the location of the mobile terminal is within the driver's area. FIG. 12 schematically shows an example of the judgment unit 802 consistent with embodiments of the present disclosure, which includes an image judgment module 8021 configured to take a camera photo through a front camera and/or a rear camera of the mobile terminal, compare the camera photo with a pre-stored picture of a corresponding position, and determine that the location of the mobile terminal is within the driver's area if a picture similarity between the camera photo and the pre-stored picture of the corresponding position is greater than a preset threshold. Details of taking the camera photo, comparing with the pre-stored picture of the corresponding position, and determining the location of the mobile terminal being within the driver's area are similar to those described above in connection with, e.g., FIGS. 1, 3 and 7, and thus are not repeated here.

As shown in FIG. 12, the judgment unit 802 further includes a region determination module 8022 configured to determine a region in which the mobile terminal or driver is located according to a type of a current network into which the mobile terminal is connected. The image judgment module 8021 is further configured to compare the camera photo with different pre-stored picture of the corresponding position according to the region in which the mobile terminal is located. Details of determining the region and performing the comparison according to the region are similar to those described above in connection with, e.g., FIGS. 1, 3, and 7, and thus are not repeated here.

Figure 13:
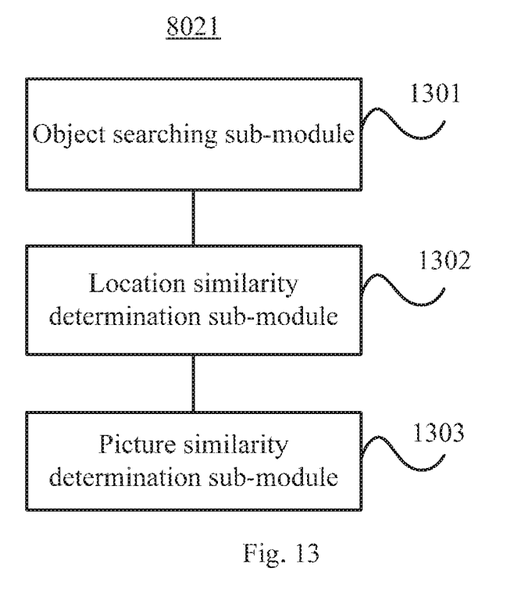
FIG. 13 is a block diagram illustrating an exemplary image judgment module according to the present disclosure.

In some embodiments, a key reference object may be preset in the pre-stored pictures of the corresponding position, and a similar-shape object having a shape similar to the key reference object is searched for in the camera photo. The picture similarity may be determined according to a shape similarity and a location similarity between the key reference object and the similar-shape object. The image judgment module 8021 is further configured to perform such searching and determination. FIG. 13 schematically shows an example of the image judgment module 8021 consistent with embodiments of the present disclosure, which includes an object searching sub-module 1301 a location similarity determination sub-module 1302, and a picture similarity determination sub-module 1303.

Specifically, the object searching sub-module 1301 is configured to perform data analysis on the camera photo, and search for a similar-shape object that has a shape similarity to a key reference object in the pre-stored picture of the corresponding position that is greater than a first threshold. The location similarity determination sub-module 1302 is configured to determine a location similarity of the similar-shape object to the key reference object. The picture similarity determination sub-module 1303 is configured to determine the picture similarity according to the shape similarity and the location similarity. Details of the functions performed by the image judgment module 8021 areee similar to those described above in connection with, e.g., FIGS. 1 and 3-7, and thus are not repeated here.

Figure 14:
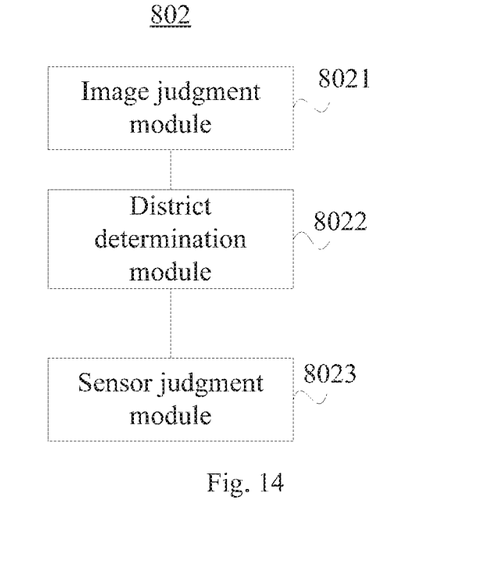
FIG. 14 is a block diagram illustrating another exemplary judgment unit according to the present disclosure.

FIG. 14 schematically shows another example of the judgment unit 802 consistent with embodiments of the present disclosure, which is similar to the judgment unit 802 shown in FIG. 12, but further includes a sensor judgment module 8023 configured to judge whether the location of the mobile terminal is within the driver's area through a sensor of the automobile. Details of using a sensor and the functions of the sensor judgment module 8023 are similar to those described above in connection with, e.g., FIGS. 1 and 3-7, and are thus not repeated here.

Figure 15:
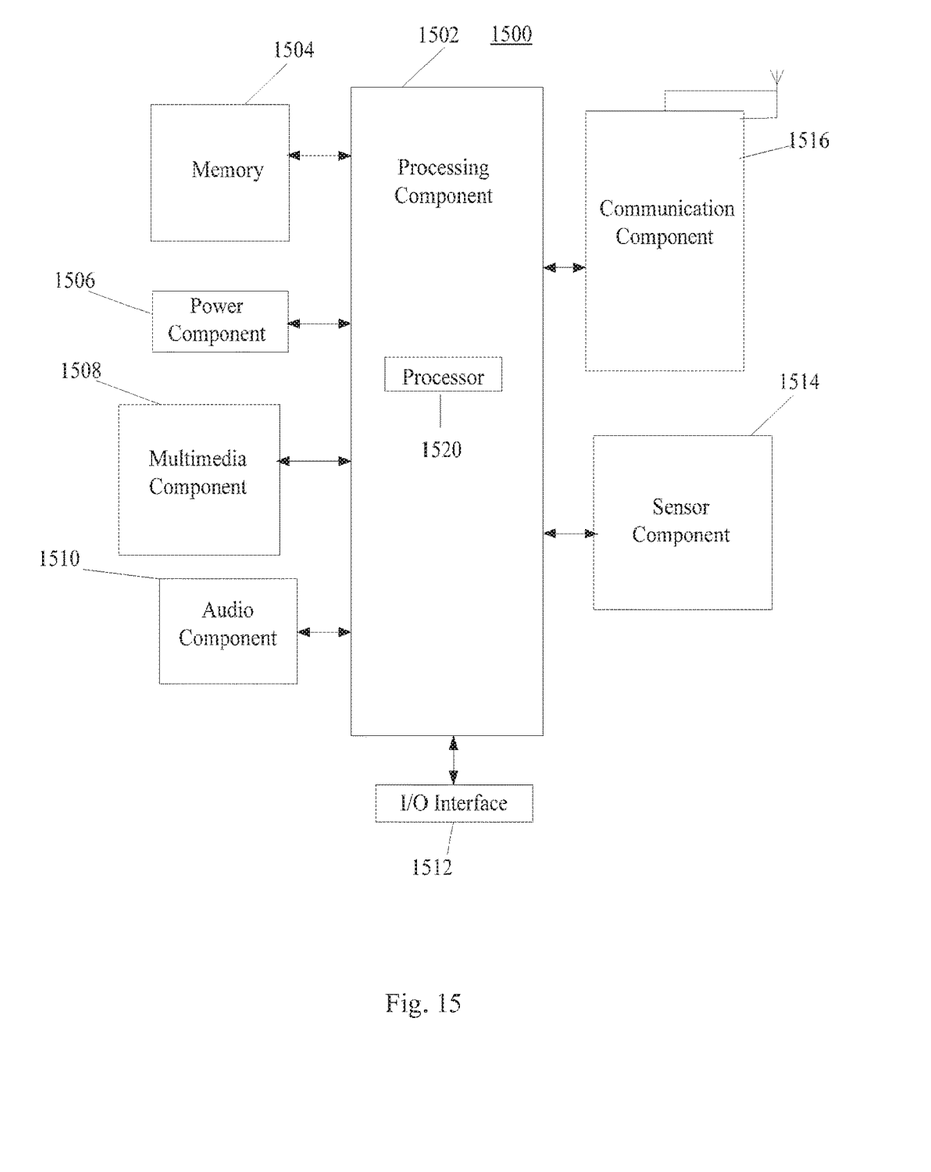
FIG. 15 is a block diagram illustrating a device for enabling a mobile terminal to be on standby according to the present disclosure.

FIG. 15 is a block diagram of an exemplary device 1500 for enabling a mobile terminal to be on standby consistent with embodiments of the present disclosure. In some embodiments, the device 1500 may constitute a part of the mobile terminal. The device 1500 may be, for example, a mobile phone, a computer, a digital broadcast terminal, a messaging device, a gaming console, a tablet, a medical device, exercise equipment, a personal digital assistant, and the like.

Referring to FIG. 15, the device 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls overall operations of the device 1500, such as the operations associated with display, telephone calls, data communications, camera operations, and recording operations. The processing component 1502 may include one or more processors 1520 to execute instructions to perform all or part of the above-described methods. Moreover, the processing component 1502 may include one or more modules which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the device 1500. Examples of such data include instructions for any applications or methods operated on the device 1500, contact data, phonebook data, messages, pictures, video, etc. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the device 1500. The power component 1506 may include a power management system, one or more power sources, and any other components associated with the generation, management, and distribution of power in the device 1500.

The multimedia component 1508 includes a screen providing an output interface between the device 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1508 includes a front camera and/or a rear camera. The front camera and the rear camera may receive an external multimedia datum while the device 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 includes a microphone ("MIC") configured to receive an external audio signal when the device 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and peripheral interface modules, such as a keyboard, a click wheel, buttons, and the like. The buttons may include, but are not limited to, a home button, a volume button, a starting button, and a locking button.

The sensor component 1514 includes one or more sensors to provide status assessments of various aspects of the device 1500. For instance, the sensor component 1514 may detect an open/closed status of the device 1500, relative positioning of components, e.g., the display and the keypad, of the device 1500, a change in position of the device 1500 or a component of the device 1500, a presence or absence of user contact with the device 1500, an orientation or an acceleration/deceleration of the device 1500, and a change in temperature of the device 1500. The sensor component 1514 may include a proximity sensor configured to detect the presence of nearby objects without any physical contact. The sensor component 1514 may also include a light sensor, such as a CMOS or CCD image sensor, for use in imaging applications. In some embodiments, the sensor component 1514 may also include an accelerometer sensor, a gyroscope sensor, a magnetic sensor, a pressure sensor, or a temperature sensor.

The communication component 1516 is configured to facilitate communication, wired or wirelessly, between the device 1500 and other devices. The device 1500 can access a wireless network based on a communication standard, such as WiFi, 2G, or 3G, or a combination thereof. In one exemplary embodiment, the communication component 1516 receives a broadcast signal or broadcast associated information from an external broadcast management system via a broadcast channel. In one exemplary embodiment, the communication component 1516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1504, executable by the processor 1520 in the device 1500, for performing the above-described methods. For example, the non-transitory computer-readable storage medium may be a ROM, a RAM, a CD-ROM, a magnetic tape, a floppy disc, an optical data storage device, and the like.

It should be understood by those skilled in the art, that the embodiments of this disclosure may be provided as methods, systems, or computer program products. Therefore, the present disclosure may adopt embodiments in forms of hardware only, software only, or a combination of software and hardware. Furthermore, the present disclosure may adopt forms of computer program products executed on one or more computer usable storage media (including but not limited to disk storage and optical storage, etc.) containing computer usable program codes.

The present disclosure is described in reference to the method, the device (system) and the flowchart and/or a block diagram of a computer program product according to the embodiments of the present disclosure. It should be understood that each process and/or block in the flowcharts and/or block diagrams, and combinations of processes and/or blocks in the flowcharts and/or block diagrams, may be realized by computer program instructions. These computer program instructions may be provided to a general-purpose computer, a special-purpose computer, an embedded processor, or processors of other programmable data processing devices, to create a machine, such that a device for realizing functions designated in one or more processes in the flowcharts and/or in one or more blocks in the block diagrams, may be created by instructions performed by a computer or processors of other programmable data processing devices.

These computer program instructions may further be stored in a computer readable storage, such as a non-transitory computer-readable storage medium, that can boot a computer or other programmable data processing devices to work in a specific way, such that a manufactured goods comprising an instruction device may be created by the instructions stored in the said computer readable storage, and the said instruction device realizes the functions designated in one or more processes in the flowcharts and/or in one or more blocks in the block diagrams.

These computer program instructions may further be loaded into a computer or other programmable data processing devices, such that a series of operating steps may be performed on the computer or other programmable data processing devices, so as to generate processes realized by the computer, such that steps for realizing the functions designated in one or more processes in the flowcharts and/or in one or more blocks in the block diagrams may be provided by the instructions executed on the computer or other programmable data processing devices.

Other embodiments of the present disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for enabling a mobile terminal to be on standby, comprising:
    determining whether the mobile terminal is in an operation state, wherein determining whether the mobile terminal is in the operation state includes determining at least one of: the mobile terminal being operated by a user, a call request being accessed, and a short message being generated;
    determining that a movement speed of the mobile terminal is greater than a preset speed;
    judging whether the mobile terminal is within a driver's area in an automobile, wherein the judging includes: generating a picture by one of a front camera or a back camera, comparing the generated picture with a pre-stored picture of a corresponding position, and judging that a location of the mobile terminal is within the driver's area, if a picture similarity between the generated picture and the pre-stored picture of the corresponding position is greater than a preset threshold; and
    enabling the mobile terminal to enter into a standby state, if the mobile terminal is within the driver's area,
    wherein the comparing of the generated picture with the pre-stored picture includes:
    searching for a similar-shape object in the generated picture, the similar-shape object having a shape similarity with respect to a key reference object in the pre-stored picture that is greater than a first threshold;
    determining a location similarity of the similar-shape object with respect to the key reference object; and
    determining the picture similarity according to the shape similarity and the location similarity, and
    wherein the pre-stored picture is taken and stored in advance and includes at least one of a left-front view when looking forward from a left-driver position of a left-hand drive automobile, a right-front view when looking forward from a right-driver position in a right-hand drive automobile, a left-rear view when looking backward from the left-driver position, and a right-rear view when looking backward from the right-driver position, and the comparing of the generated picture with the pre-stored picture includes:
    determining, according to a type of a current network to which the mobile terminal is connected, a region in which the mobile terminal is located to be one of a left-hand drive region or a right-hand drive region;
    comparing a first camera photo taken by the front camera with the left-front view and comparing a second camera photo taken by the rear camera with the left-rear view, if the region is the left-hand drive region; and
    comparing the first camera photo with the right-front view and comparing the second camera photo with the right-rear view, if the region is the right-hand drive region.

2. The method of claim 1, further comprising:
    acquiring the movement speed of the mobile terminal before determining that the movement speed of the mobile terminal is greater than the preset speed.

3. The method of claim 1, wherein acquiring the movement speed of the mobile terminal includes at least one of:
    acquiring at least two items of location information of the mobile terminal at different timings within a preset period, and determining the movement speed of the mobile terminal according to the at least two items of location information; or
    acquiring a movement speed of the automobile through an on-board computer as the movement speed of the mobile terminal.

4. The method of claim 1, wherein judging whether the mobile terminal is within the driver's area includes:
    judging whether the mobile terminal is within the driver's area using a sensor of the automobile.

5. A device for enabling a mobile terminal to be on standby, comprising:
    a processor; and
    a non-transitory computer-readable storage medium storing instructions that, when executed by the processor, cause the processor to:
    determine whether the mobile terminal is in an operation state, wherein determining whether the mobile terminal is in the operation state includes determining at least one of: the mobile terminal being operated by a user, a call request being accessed, and a short message being generated;
    determine that a movement speed of the mobile terminal is greater than a preset speed;
    judge whether the mobile terminal is within a driver's area in an automobile by: generating a picture by one of a front camera or a back camera, comparing the generated picture with a pre-stored picture of a corresponding position, and judging that a location of the mobile terminal is within the driver's area, if a picture similarity between the generated picture and the pre-stored picture of the corresponding position is greater than a preset threshold; and
    enable the mobile terminal to enter into a standby state, if the mobile terminal is within the driver's area,
    wherein, in comparing the generated picture with the pre-stored picture, the instructions further cause the processor to:
    search for a similar-shape object in the generated picture, the similar-shape object having a shape similarity with respect to a key reference object in the pre-stored picture that is greater than a first threshold;
    determine a location similarity of the similar-shape object with respect to the key reference object; and determine the picture similarity according to the shape similarity and the location similarity, and wherein the pre-stored picture is taken and stored in advance and includes at least one of a left-front view when looking forward from a left-driver position of a left-hand drive automobile, a right-front view when looking forward from a right-driver position in a right-hand drive automobile, a left-rear view when looking backward from the left-driver position, and a right-rear view when looking backward from the right-driver position, and in comparing the generated picture with the pre-stored picture, the instructions further cause the processor to:

determine, according to a type of a current network to which the mobile terminal is connected, a region in which the mobile terminal is located to be one of a left-hand drive region or a right-hand drive region;

compare a first camera photo taken by the front camera with the left-front view and comparing a second camera photo taken by the rear camera with the left-rear view, if the region is the left-hand drive region; and compare the first camera photo with the right-front view and comparing the second camera photo with the right-rear view, if the region is the right-hand drive region.

6. The device of claim 5, wherein the instructions further cause the processor to:

acquire the movement speed of the mobile terminal before determining that the movement speed of the mobile terminal is greater than the preset speed.

7. The device of claim 6, wherein the instructions causing the processor to acquire the movement speed of the mobile terminal include instructions causing the processor to perform at least one of:

acquiring at least two items of location information of the mobile terminal at different timings within a preset period, and determining the movement speed of the mobile terminal according to the at least two items of location information; or acquiring a movement speed of the automobile through an on-board computer as the movement speed of the mobile terminal.

8. The device of claim 5, wherein the instructions causing the processor to judge whether the mobile terminal is within the driver's area include instructions causing the processor to:

judge whether the mobile terminal is within the driver's area using a sensor of the automobile.

9. A non-transitory computer-readable storage medium storing instructions that, when executed by one or more processors in a terminal, cause the one or more processors to:

determine whether the mobile terminal is in an operation state, wherein determining whether the mobile terminal is in the operation state includes determining at least one of: the mobile terminal being operated by a user, a call request being accessed, and a short message being generated;

determine that a movement speed of the mobile terminal is greater than a preset speed;

judge whether the mobile terminal is within a driver's area in an automobile by: generating a picture by a front camera and/or a back camera, comparing the generated picture with a pre-stored picture of a corresponding position, and judging that the location of the mobile terminal is within the driver's area, if a picture similarity between the generated picture and the pre-stored picture of the corresponding position is greater than a preset threshold; and enable the mobile terminal to enter into a standby state, if the mobile terminal is within the driver's area, wherein, in comparing the generated picture with the pre-stored picture, the instructions further cause the processor to:

search for a similar-shape object in the camera photo, the similar-shape object having a shape similarity with respect to a key reference object in the pre-stored picture that is greater than a first threshold;

determine a location similarity of the similar-shape object with respect to the key reference object; and determine the picture similarity according to the shape similarity and the location similarity, and wherein the pre-stored picture is taken and stored in advance and includes at least one of a left-front view when looking forward from a left-driver position of a left-hand drive automobile, a right-front view when looking forward from a right-driver position in a right-hand drive automobile, a left-rear view when looking backward from the left-driver position, and a right-rear view when looking backward from the right-driver position, and in comparing the generated picture with the pre-stored picture, the instructions further cause the processor to:

determine, according to a type of a current network to which the mobile terminal is connected, a region in which the mobile terminal is located to be one of a left-hand drive region or a right-hand drive region;

compare a first camera photo taken by the front camera with the left-front view and comparing a second camera photo taken by the rear camera with the left-rear view, if the region is the left-hand drive region; and compare the first camera photo with the right-front view and comparing the second camera photo with the right-rear view, if the region is the right-hand drive region.

* * * * *